May 6, 1924.
L. W. RASMUS
LOCK FOR VEHICLES
Filed Sept. 12, 1921
1,493,384
2 Sheets-Sheet 1
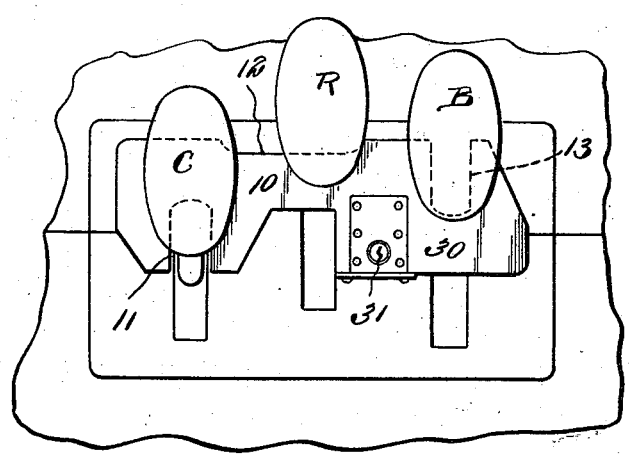
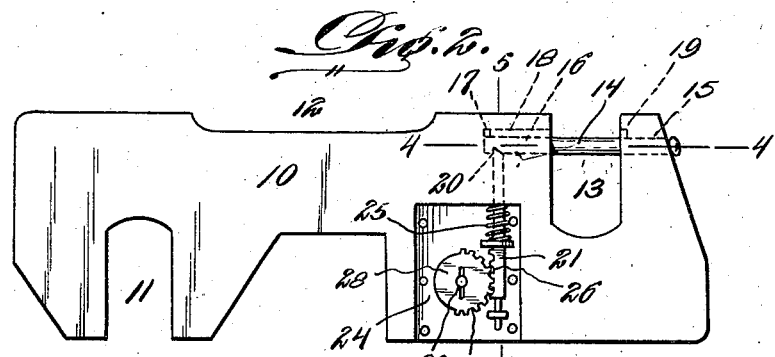
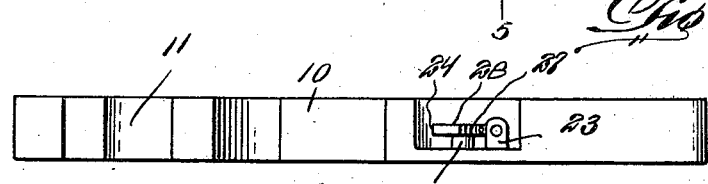
L. W. Rasmus,
INVENTOR
BY *Victor J. Evans*
ATTORNEY

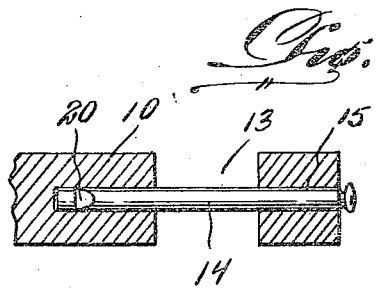
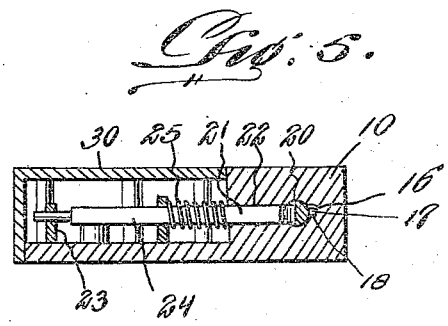
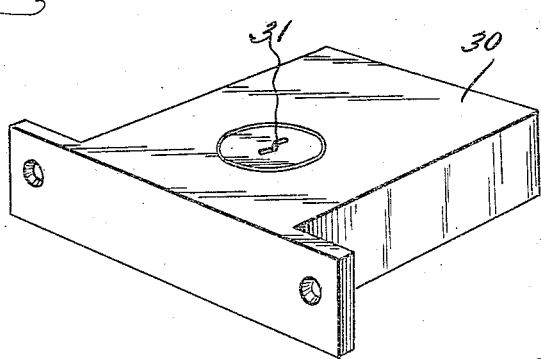

Patented May 6, 1924.

1,493,384

UNITED STATES PATENT OFFICE.

LEVI WILLIAM RASMUS, OF EAU CLAIRE, WISCONSIN.

LOCK FOR VEHICLES.

Application filed September 12, 1921. Serial No. 499,873.

*To all whom it may concern:*

Be it known that I, LEVI WILLIAM RASMUS, a citizen of the United States, residing at Eau Claire, in the county of Eau Claire and State of Wisconsin, have invented new and useful Improvements in Locks for Vehicles, of which the following is a specification.

This invention relates to improvements in locks for automobiles and has for an object the provision of a lock which is applicable to the foot pedals of an automobile for the purpose of locking the transmission gearing against operation, the invention being especially adapted for use upon "Ford" automobiles.

To this end, the invention aims to provide means whereby the transmission may be locked both in high speed forward and in reverse, so that it will be impossible to operate the transmission either forward or backward, while as an additional safeguard, the brake is locked in its active position.

With the above and other objects in view, the invention further includes the following novel features and details of construction, to be hereinafter more fully described, illustrated in the accompanying drawings and pointed out in the appended claim.

In the drawings:—

Figure 1 is a fragmentary plan view illustrating the foot pedals of a "Ford" automobile with the invention applied.

Figure 2 is an enlarged plan view of the lock detached from the pedal with the cover plate removed.

Figure 3 is an edge view of the same.

Figure 4 is an enlarged section on the line 4—4 of Figure 2 with the cover plate in place.

Figure 5 is a section on the line 5—5 of Figure 2.

Figure 6 is a detail perspective view of the cover plate.

Referring in detail to the drawings, wherein like characters of reference denote corresponding parts, the reference character C indicates the clutch pedal, R the reverse pedal and B the brake pedal, of a "Ford" automobile.

The invention which is designed to be secured to these pedals comprises a body member 10, which may be formed of any suitable material and which is provided with recesses 11, 12 and 13, the first and last mentioned recesses being in the form of slots and extending inwardly from opposite side edges of the body member, while the recess 12 is in the form of a depression located along the edge of the body member opposite the open end of the slot 11.

In order to secure the body member in position upon the pedals C, R and B, the slot 13 is adapted to be closed by a slidingly mounted bolt 14 which is movable transversely of the outer end of the slot and operates through an opening 15 and enters a socket 16, provided in the body member. The bolt 14 is formed with a guide lug 17 which is movable in a recess 18. This recess is in communication with the socket 16 and the lug 17 when engageable therein acts to prevent rotation of the bolt 14. In addition, the lug 17 prevents the removal of the bolt 14 from the body member. When the slot 13 is fully open, the lug 17 will be seated within a seat 19 provided at the inner end of the opening 15.

The bolt 14 has its inner end provided with a notch 20, which is adapted for engagement with a spring actuated bolt 21. This last mentioned bolt is disposed at right angles to the bolt 14 and operates in a guide opening 22 provided in the body member 10 and through a guide 23, which is located within a recess 24, within which recess the bolt 21 is also located. The bolt 21 is normally urged into engagement with the notch 20 of the bolt 14 by means of a spring 25.

The bolt 21 is provided along one side edge with teeth 26 which are engaged by teeth 27 provided upon a gear 28. This gear is mounted for rotation upon a shaft 29 and when rotated will move the bolt longitudinally to disengage the same from the notch 20.

The recess 24 is closed by a cover plate 30, which is provided with a key hole slot 31, while a lock of any suitable character may be operatively connected with the shaft 29 or the gear 28, to be operated by a key.

In the use of the invention, the clutch pedal C is moved into high speed position through the manipulation of the usual hand brake lever. The reverse pedal R is then pushed downward and the body member 10 positioned so that the slot 11 receives the clutch pedal C, while the recess 12 receives the reverse pedal R and the slot 13 receives the brake pedal B. The bolt 14 is then pushed inward so as to be engaged by the spring actuated bolt 21 and the device is then locked against unauthorized removal. It will be apparent that when in this position, the transmission will be both in high gear forward and in reverse gear, so that the automobile cannot move in either direction, while the locking of the brake pedal, which has been previously moved to an active position, acts as a further safeguard. If desired, after the invention has been applied, the end of the brake lever may be brought back to its former position, but the clutch pedal C will remain in high, as it is locked against movement.

The invention is susceptible of various changes in its form, proportions and minor details of construction and the right is herein reserved to make such changes as properly fall within the scope of the appended claim.

Having described the invention what is claimed is:—

In an automobile lock, the combination with a plurality of control pedals including a clutch pedal, a brake pedal and a reverse pedal, of a plate having parallel notches extending inwardly from opposite sides thereof adjacent the ends to receive the clutch and brake pedals, a recess provided in the edge of the plate containing the brake pedal notch, to receive the reverse pedal, a rod slidable across and closing the brake pedal notch for holding the plate in position and a locking bolt carried by the plate and engaging the rod to prevent unauthorized removal.

In testimony whereof I affix my signature.

LEVI WILLIAM RASMUS.